United States Patent

Kurachi et al.

Patent Number: 5,247,341
Date of Patent: Sep. 21, 1993

[54] LENSMETER FOR AUTOMATICALLY MEASURING OPTICAL CHARACTERISTIC OF A POWER LENS

[75] Inventors: Mikio Kurachi, Aichi; Toshiaki Mizuno, Gamagori; Hirokatsu Obayashi, Aichi, all of Japan

[73] Assignee: Nidek Co., Ltd., Gamagori, Japan

[21] Appl. No.: 727,738

[22] Filed: Jul. 10, 1991

[30] Foreign Application Priority Data

Jul. 11, 1990 [JP] Japan ................................ 2-183516
Jul. 19, 1990 [JP] Japan ................................ 2-190983

[51] Int. Cl.⁵ .............................................. G01B 9/00
[52] U.S. Cl. ..................................... 356/127; 356/125
[58] Field of Search ............... 356/124, 125, 126, 127, 356/153

[56] References Cited

U.S. PATENT DOCUMENTS

| 4,534,645 | 8/1985 | Nohda ................................ 356/127 |
| 4,641,964 | 2/1987 | Mitani et al. ...................... 356/127 |
| 4,779,979 | 10/1988 | Iwane ................................ 356/127 |

FOREIGN PATENT DOCUMENTS

2925951A1 1/1980 Fed. Rep. of Germany .
2934263A1 3/1981 Fed. Rep. of Germany .
3223438A1 3/1983 Fed. Rep. of Germany .

OTHER PUBLICATIONS

DE-Buch: Pancove, J. I.: Display Devices, Springer Verlage Berlin 1980, S.VII-XII.
Prospekt Topcon Computerized lensmeter CL-1000, der Fa. Topcon Deutschland. 4156 Willich, im DPA eingg. Mar. 26, 1990.

Primary Examiner—Richard A. Rosenberger
Assistant Examiner—Hoa Q. Pham
Attorney, Agent, or Firm—Nikaido, Marmelstein, Murray & Oram

[57] ABSTRACT

An automatic lensmeter for measuring optical characteristics of a lens to be examined is disclosed. The automatic lensmeter includes a display for displaying thereon an alignment target, first and second calculation devices for converting a shift between the optical center of the lens to be examined and a measurement optical axis into a prism power and a deviation respectively, and device for forming the alignment target at a predetermined position, whereby highly accurate alignment can be attained and accurate marking can be readily obtained.

7 Claims, 5 Drawing Sheets

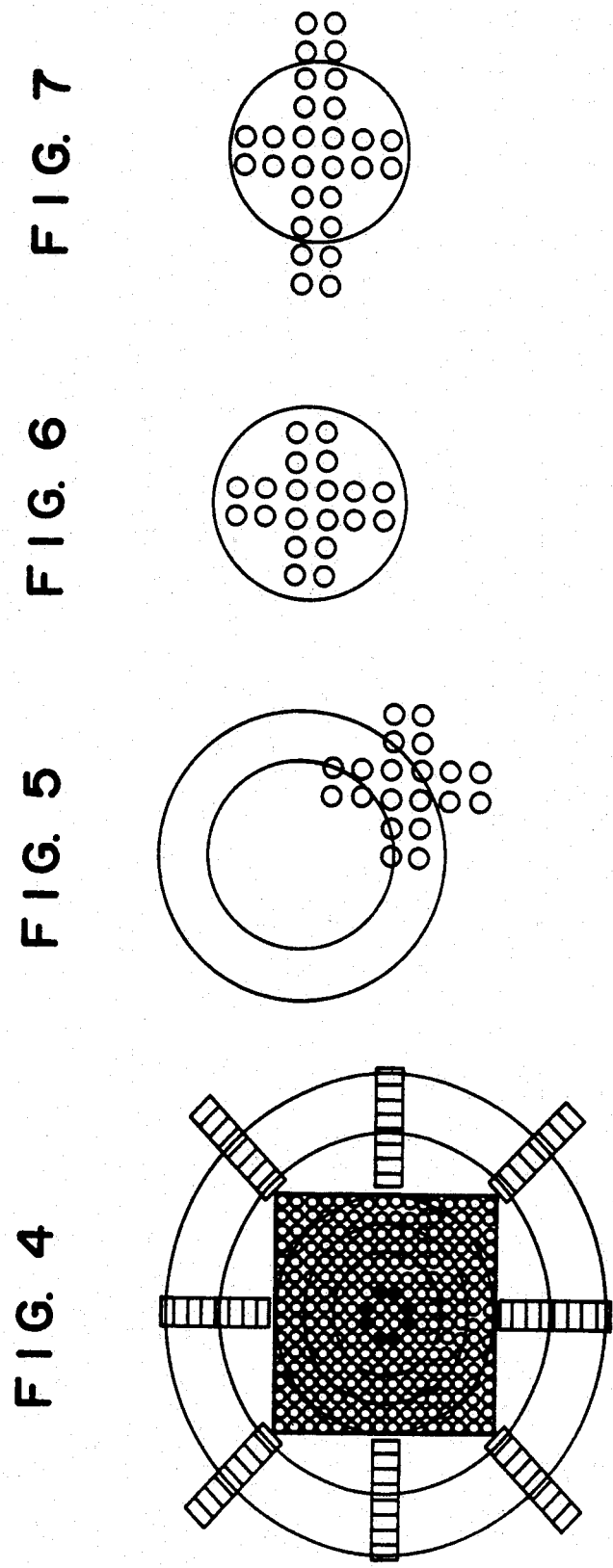

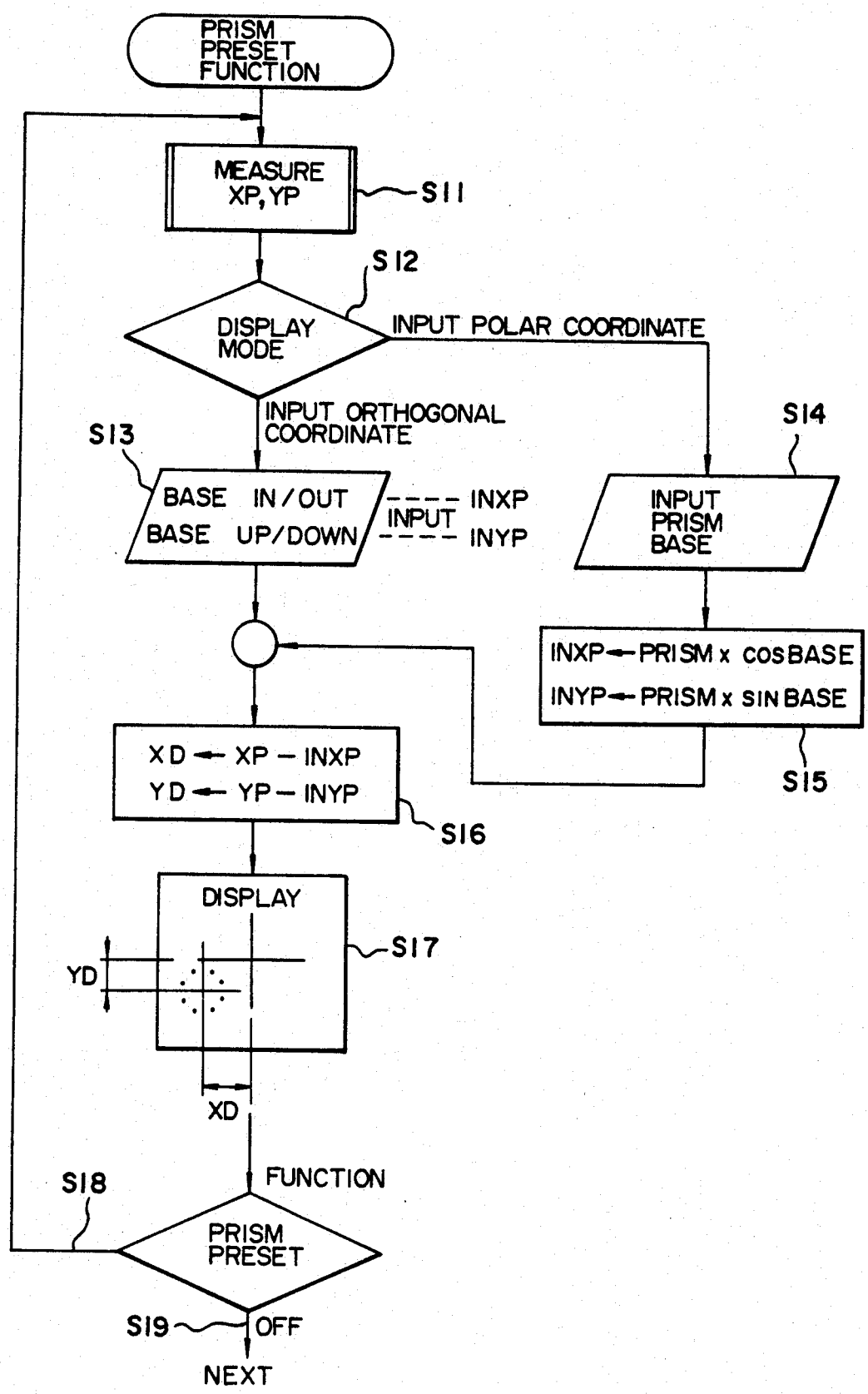

LENSMETER FOR AUTOMATICALLY MEASURING OPTICAL CHARACTERISTIC OF A POWER LENS

BACKGROUND OF THE INVENTION

The present invention generally relates to an automatic lensmeter and, more particularly, to a mechanism for displaying an alignment target indicative of the position of a lens to be examined relative to the optical axis of a measurement optical system.

There have been so far proposed various sorts of lensmeters which automatically measure optical characteristics of ophthalmic lenses for use in spectacles.

In these automatic lensmeter, a mechanism for indicating a relative position of the optical center of a lens to be examined with respect to the optical axis of a measurement optical system is indispensable. To this end, generally speaking, a target called a corona target or a cross line target is indicated on a display together with a mark indicative of the measurement optical axis.

There have so far existed several systems of displaying a relative positional relationship of the optical center of a lens to be examined with respect to the optical axis of a measurement optical system, which follow.

In a first display system, prism power (prism diopter) occurred when the optical axis of the measurement optical system is shifted from the optical center of the lens to be examined is measured and the position of the target is indicated in terms of the magnitude of the measured prism power. An optical aberration has a correlative relationship with the diopter. However, it is advantageous to indicate a shift between the optical axis of the measurement optical system and the optical center of the lens to be examined in the form of prism power, so that the range guaranteed to measure accurately the optical characteristics can be set with use of a standardized reference.

In a second display system, a deviation (distance) between the optical center of a lens to be examined and the optical axis of a measurement optical system is calculated and the position of a target is indicated in terms of the calculated deviation. According to this system, the movement of the lens to be examined and the movement of the target can be made advantageously proportional to each other.

With the first display system based on the prism power, since a lens having large diopter varies greatly in prism power even in the vicinity of its optical center, it is disadvantageously difficult to attain alignment.

The first display system is also defective from the viewpoint of its manufacturing cost in the more accurate alignment cannot be obtained without increasing the resolution of the display.

The second display system of positioning and displaying the target at the position proportional to the deviation between the optical center of the lens to be examined and the optical axis of the measurement optical system, on the other hand, has such a problem that, when the standardized range is set so as to be guarantee the measurement accuracy, a lens having large diopter must be employed as a reference and thus strict positioning is required even in a lens having small diopter.

Further, accurate positioning involves the need for increasing the resolution of the display or the need for increasing its magnification. The former results in a high manufacturing cost, while the latter results in reduction of the display range.

There have been conventionally proposed various sorts of automatic lensmeters which allow marking or the lens.

The marking is usually carried out at the optical center. However, it is convenient in prism prescription to perform marking at a position where a prism to be prescribed is added. To this end, when it is desired to perform marking at a position other than the optical center, it has been conventionally common practice to move the lens in such a manner as to make the measured prism power indicated on the display visually coincide with the prescribed value, at which coincided position the axis marking has been conducted.

The above marking method, however, has been defective in that an operator must greatly resort to his experience and therefore it takes a lot of time in the marking work. Further, in the case of an astigmatic lens, the lens must be moved so as to obtain a coincidence of even its cylindrical axial angle, thus resulting in very hard marking work.

SUMMARY OF THE INVENTION

It is therefore an object of the present invention to provide an automatic lensmeter which eliminates the above defects in the prior art and which can quickly measure optical characteristics of lenses having any refractive powers while allowing its highly accurate positioning.

Another object of the present invention is to provide an automatic lensmeter for easily achieving the marking work at the position at which the prism value is added.

A feature of the present invention is to provide an automatic lensmeter for automatically measuring optical characteristics of a lens to be examined such as spherical power and cylindrical power inserted in a measurement optical system, comprising:

measurement means for measuring a shift between an optical center of the lens to be examined inserted in the measurement optical system and an optical axis of the measurement optical system;

first calculation means for converting the shift measured by said measurement means into a prism power;

second calculation means for converting the measured shift as a deviation;

comparison means for comparing the converted value by said first calculation means with a predetermined value; and display means for displaying thereon a positioning target selectively, on the basis of the comparison result obtained by said comprising means, in a coordinate system having its coordinate axis as the prism power or in a coordinate system having its coordinate axis as the deviation.

Another feature of the present invention is to provide an automatic lensmeter for automatically measuring optical characteristics of a lens to be examined such as spherical power and cylindrical power inserted in a measurement optical system, comprising:

measurement means for measuring a shift between an optical center of the lens to be examined inserted in the measurement optical system and an optical axis of the measurement optical system;

calculation means for calculating prism power and/or deviation on the basis of the shift measured by said measurement means;

input means for entering pre-measured prism power of an eye to be examined;

coordinate transformation means for transforming a positional coordinate system of the prism power and/or deviation calculated by said calculation means having the optical axis of the measurement optical system as an origin into a coordinate system having a position of the prism power entered through said input means as an origin; and formation means for forming a positioning target on a display in the coordinate system transformed by said coordinate transformation means.

BRIEF DESCRIPTION OF THE DRAWINGS

FIG. 4 is a corona target on a display;

FIG. 5 is a cross line target on the display;

FIG. 6 is a state on the display when alignment with the cross line target is completed;

FIG. 7 is a state on the display when alignment of an astigmatic lens is completed;

FIG. 9 is a flowchart for explaining the operation of the automatic lensmeter when marking is carried out at a position where a prism to be prescribed is added.

DESCRIPTION OF THE PREFERRED EMBODIMENTS

An embodiment of the present invention will be explained with reference to the attached drawings.

Figure 1:
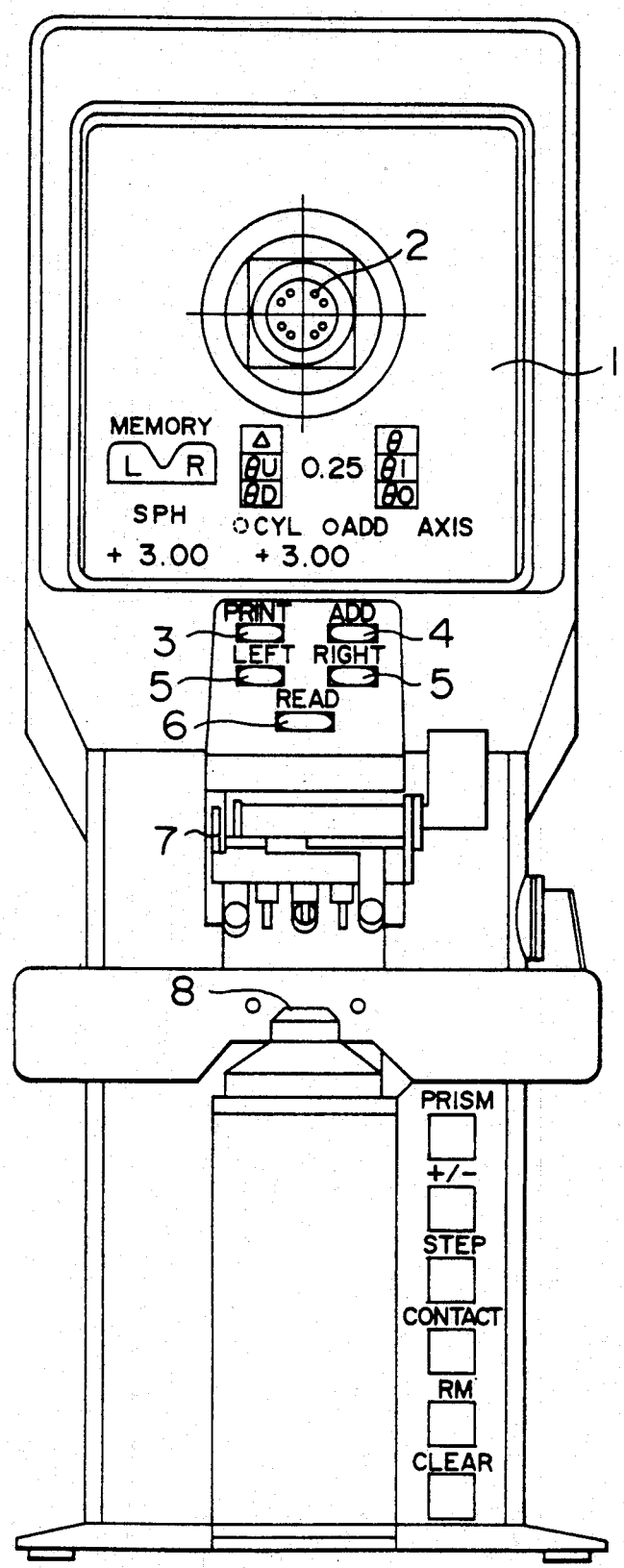
FIG. 1 is a front view of an automatic lensmeter in accordance with an embodiment of the present invention.

Referring first to FIG. 1, there is shown an exterior appearance view of an automatic lensmeter in accordance with an embodiment of the present invention. The automatic lensmeter of FIG. 1 includes a display 1 which comprises a reticule having the optical axis of a measuring optical system in its center, an alignment target 2 (which is shown as a corona target in FIG. 1 to be detailed later), and an LED dot matrix display for indicating thereon measured results and so on. The lensmeter also includes a PRINT switch 3 for printing the measured results, an ADD switch 4 for changing to an addition diopter measurement mode, LEFT/RIGHT switches 5 an 5 for selecting to measure a left-eye or a right-eye lens, a READ switch 6 for reading measured values a lens holder 7, and a nose piece 8. A lens to be examined is held in place by mounting the lens to be examined on the nose piece 8 and then lowering the lens holder 7.

Explanation will next be made as to an embodiment of the measuring optical system of the automatic lensmeter.

Figures 2, 3:
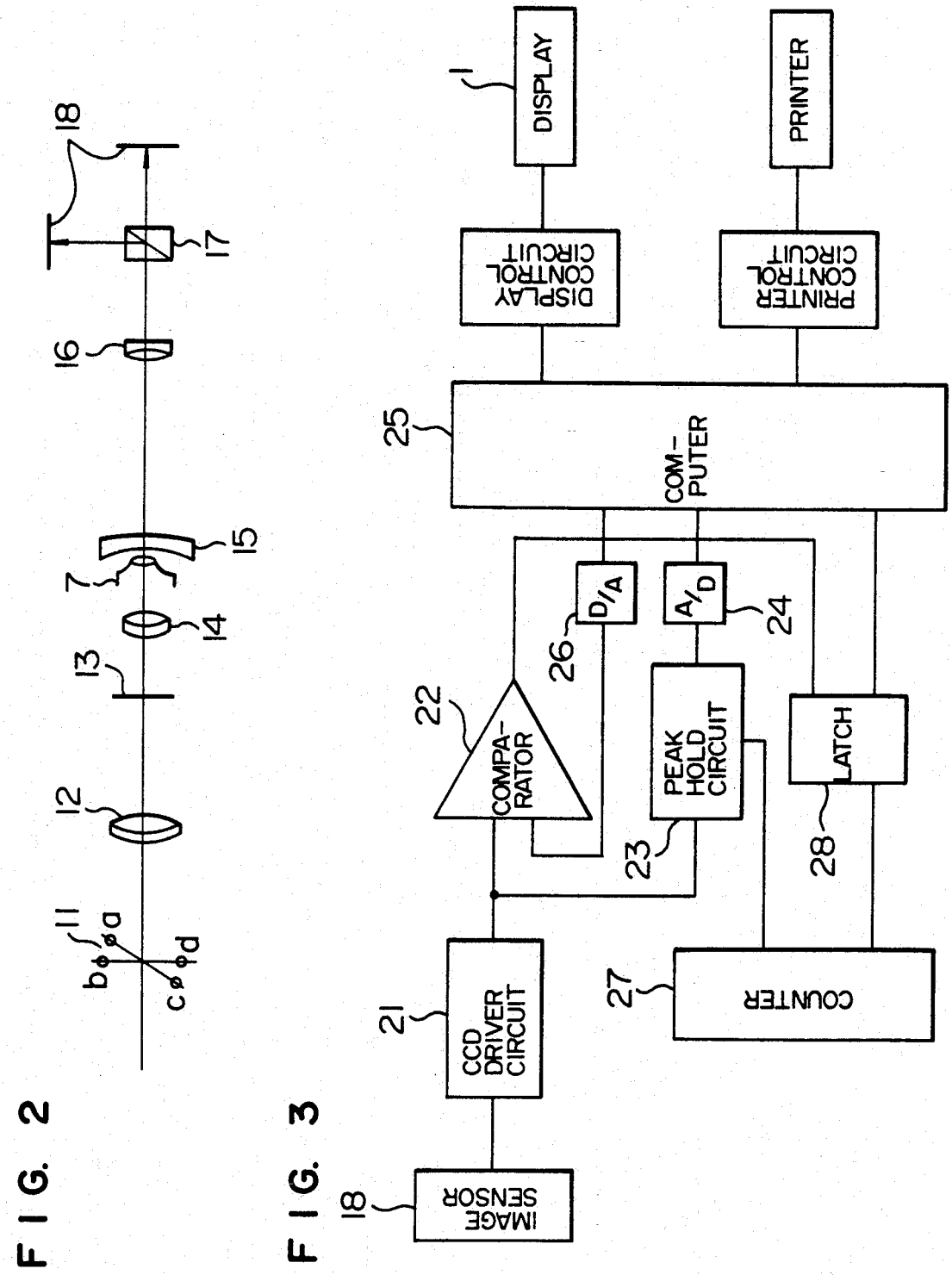
FIG. 2 is an arrangement of an optical system used in the automatic lensmeter.
FIG. 3 is a block diagram of a control system in the automatic lensmeter of the embodiment.

Shown in FIG. 2 is an arrangement of the optical system of the automatic lensmeter.

In the optical system, four light emitting elements 11 such as light emitting diodes (LEDs) are disposed to be perpendicular to the optical axis of the optical system in the vicinity of the focal point of an objective lens 12. More specifically, the four light emitting elements 11 are four LEDs a, b, c and d. When a lens 15 to be examined is mounted on the nose piece 8, a LED driver is actuated in response to a instruction sent from a computer so that the four LEDs a, b, c and d are sequentially turned ON.

A target 13 having slits perpendicular to each other therein is positioned fixedly or movably between the objective lens 12 and a collimater lens 14 and in the vicinity of the focal point thereof. The nose piece 8 is disposed between the collimater lens 14 and a focusing lens 16 and in the vicinity of the focal point thereof. Reference numeral 17 denotes a half prism and 18 denotes image sensors which are provided to be perpendicular to each other with respect to the optical axis.

In operation, light emitted from the LEDs is passed through the objective lens 12, the collimater lens 14, the lens 15 to be examined, and the focussing lens 16 and then focused on the two image sensors 18 and 18 disposed perpendicular to each other.

As shown in FIG. 3, signals outputted from the two image sensors 18 and 18 are sent through a CCD driving circuit 21 to a comparator 22 and a peak hold circuit 23. A peak voltage as an output of the peak hold circuit 23 is converted into a digital signal at an A/D converter 24 and then sent to a computer 25. The digital signal corresponding to the peak voltage of the peak hold circuit 23 is also sent through the computer 25 to a D/A converter 26 to be converted thereat into the voltage signal corresponding to ½ of the peak voltage and further applied to the comparator 22. The comparator 22 compares the signal received from the D/A converter 26 with the signal received directly from the CCD driving circuit 21 and generates a strobe signal. The strobe signal is sent from the comparator 22 to a latch 28. That is, the latch 28, in response to the strobe signal received from the comparator 22, accepts a signal from a counter 27, reads out the border of a bright portion and a dark portion from the waveform of the accepted signal, and detects its coordinate position under control of the computer 25.

Explanation will next be briefly made as to how to calculate a measured value on the basis of the detected coordinate position.

The target 13 is subjected to individual illumination of the four LEDs a, b, c and d. In the case where no lens to be examined is mounted on the nose piece 8 and where a lens to be examined having zero diopter is mounted on the nose piece 8, target images formed on the image sensors 18 by the four LEDs a, b, c and d are all overlapped with each other.

When the lens 15 to be examined has only spherical refractive power, the target images formed on the image sensors 18 are shifted in position thereon by an amount corresponding to the spherical diopter.

When the lens 15 to be examined has only cylindrical refractive power, a light beam incident upon the cylindrical lens is subjected to refractive power in the direction perpendicular to (as) its principal meridian (or in the same direction as the principal meridian). Thus the cylindrical diopter can be calculated on the basis of the shift of the target images.

In the case where the lens 15 to be examined has both spherical and cylindrical refractive powers, the target images are focused on the image sensor 18 as shifted by an amount corresponding to their refractive diopters.

Assume now that, when the four LEDs a, b, c and d are turned ON, their target images have centers of $A(x_a, y_a)$, $B(x_b, y_b)$, $C(x_c, y_c)$ and $D(x_d, y_d)$, respectively and $X_1$, $X_2$, $Y_1$ and $Y_2$ are expressed as follows.

$$X_1 = |x_b - x_d|, X_2 = x_a - x_c|$$

$Y_1 = |y_a - y_c|$, and $Y_2 = y_b - Y_d|$

Then spherical diopter S, cylindrical diopter C, axial angle $\theta$ and prism power are expressed as follows.

Spherical diopter $S = (X_2 + Y_2 \pm C)/2$

Cylindrical diopter $C = \sqrt{(X_2 - Y_2)^2 - 2(X_1^2 + Y_1^2)}$

Axial angle $\theta = \tan^{-1}\sqrt{(X_2 - S)/(Y_2 - S)}$ or $\tan^{-1}\sqrt{(Y_2 - S)/(X_2 - S)}$ Prism power =

$\sqrt{[(x_a + x_b + x_c + x_d)/4]^2 + [(y_a + y_b + y_c + y_d)/4]^2}$

The computer 25 detects the coordinate position, calculates the spherical diopter, cylindrical diopter, axial angle and prism power in accordance with the aforementioned calculation expressions and digitally displays the values.

When the lens to be examined has diopter (refractive power) other than zero diopter, the four target images become out of focus. For the purpose of avoiding this, the positions of the images are shifted by an amount corresponding to the diopter, which results in a cause of a measurement error. Accordingly, it is desirable in the practical lensmeter that the measuring target is shifted in order to reduce a deviation caused by the out-of-focus, so that the optical characteristics of the lens to be measured are calculated on the basis of the shift of the measuring target and the image position.

Explanation will next be made as to how to form the alignment target by referring to a flowchart of FIG. 8.

When the lensmeter is in its measurement mode, the measurement system is successively actuated at constant intervals to measure the optical characteristics of a lens to be measured S1. In such a manner as mentioned above, the computer 25 computes the spherical diopter, cylindrical diopter, axial angle and prism power of the lens to be examined S2. Then the computer 25 causes indication S4 of the computed spherical diopter, cylindrical diopter and axis angle in the lower part of the display 1, and also causes display of the corona target S5 in accordance with the computed prism power under control of a display control circuit at a predetermined position of the reticule having in its center the optical axis of the measurement optical system displayed on the display.

FIG. 4 is an enlarged view of a reticule display part on the display, which has a 16×16 dot-matrix display positioned in its center and an LED array of 8 LEDs radially arranged outside the dot-matrix display. The reticule having the optical axis of the measurement optical system set in the center comprises circles indicative of 1Δ, 1.5Δ and 2Δ arranged around the center of the optical axis on the display.

Figure 8:
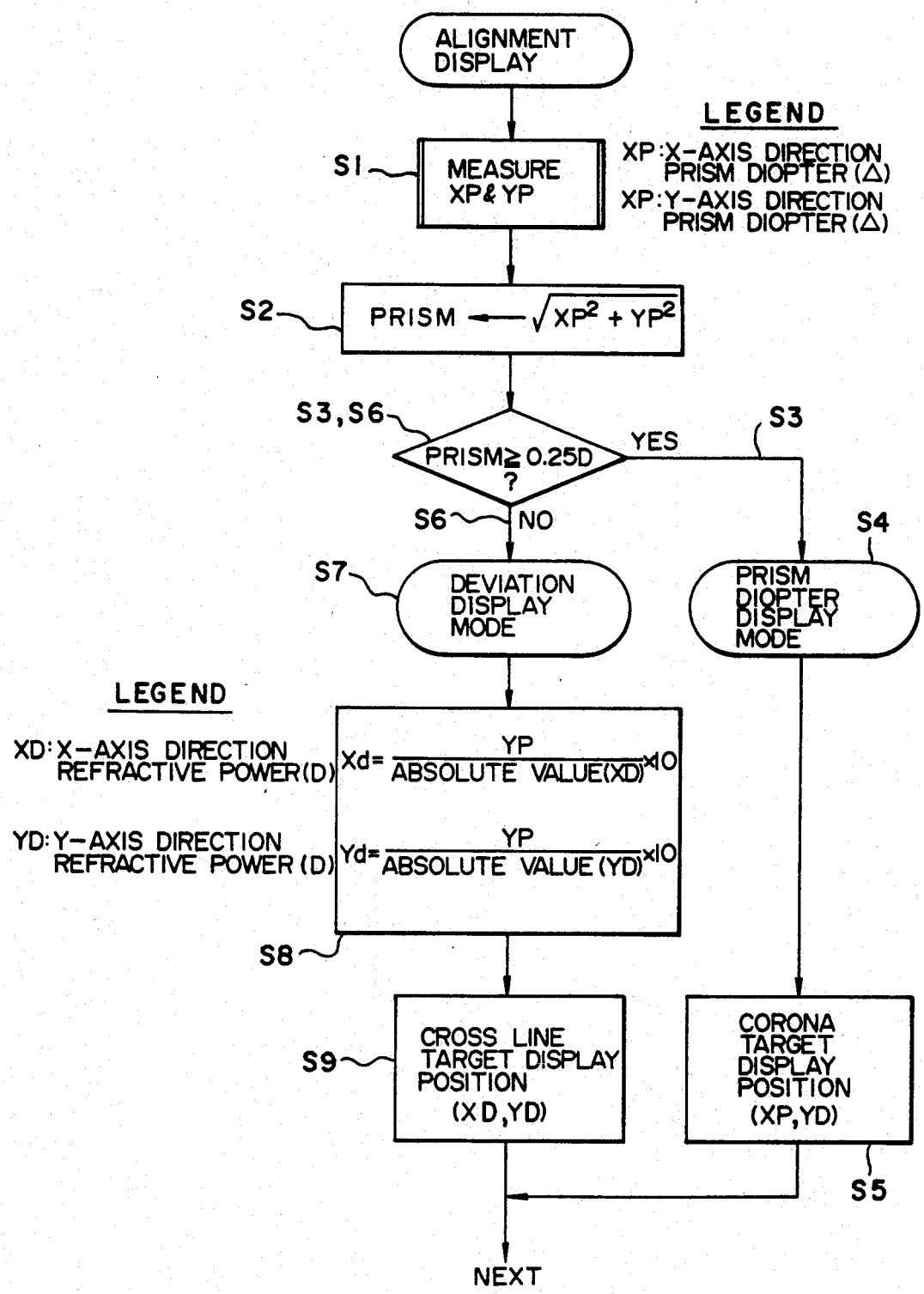
FIG. 8 is a flowchart for explaining an alignment display manner of the present embodiment.

In the present embodiment, when the measurement prism is 0.25Δ or more S5 (see, FIG. 8), corona target display is provided (S5 see, FIG. 8). When the measurement prism is in a range of above 0.25Δ and below 2Δ, the corona target is moved vertically or horizontally in proportion to the prism value at intervals of 0.25Δ. When the measurement prism exceeds 2Δ, the target is moved on the rearmost LED array toward outer side at intervals of 1Δ.

When the corona target is in a 1Δ circle, this indicates that it is possible to realize measurement without any influence of an aberration and so on (Refer to FIG. 4). Accordingly, alignment for the measurement of the optical characteristics can be quickly attained.

Further, when it is necessary to mark the ophthalmic lens, alignment is carried out below 0.25Δ S6, and a deviation display is provided S7 (see, FIG. 8). The alignment of below 0.25Δ causes the target to be switched to the cross line target (Refer to FIG. 5). At this time, the movement of the target is made proportional not to the prism power but to a distance (deviation) between the optical center of the lens to be examined and the measurement optical axis. The deviation is calculated S8 in accordance with the following equation using the diopter of the lens to be examined and the prism power:

$$\text{Deviation (mm)} = \text{Prism diopter power} \times \frac{10}{\text{Diopter (1/mm)}}$$

$$= 1.5 \times \frac{10}{5 \text{ (1/mm)}}$$

$$= 3 \text{ (mm)}.$$

The present embodiment is arranged so that, when the target is located in the center according to a generally requested reference, alignment is carried out below 0.2 mm. When the deviation exceeds 0.2 mm, the target is shifted by an amount corresponding to one dot from the center for every 0.4 mm deviation. For example, in the case where the lens has spherical diopter S of +20D, alignment below 0.25Δ causes the deviation to be 0.2 mm or less, thus resulting in that the cross line target is displayed in the center S9 (see, FIG. 8) (See also FIG. 6). In this way, by switchingly selecting one of two stages of alignment method, highly accurate alignment can be readily attained.

In the case of an astigmatism lens, cylindrical axial angle is 180 degrees (or 90 degrees) or marking is made at a prescribed value. When marking is done at the prescribed value, its axial angle is determined and marking is carried out by observing an indication on the display. When the axial angle coincides with 180 degrees, the horizontal line of the target is extended, while when the axial angle coincides with 90 degrees, the vertical line of the target is extended, whereby completion of the alignment is informed (See FIG. 7). This is because there have been increasingly proposed such modern lens-meters of a so-called patternless lensedger type that axial angle is input to the lensedger side and an marking angle is set indiscriminately at 180 or 90 degrees.

In this connection, the graduation of the reticule is not limited only to the above case but may be modified in various ways depending on the required accuracy.

In accordance with the automatic lensmeter of the foregoing embodiment, accurate alignment can be highly easily realized and in particular, relatively rough alignment necessary in the measurement mode as well as fine alignment necessary at the time of marking can be both realized through simple operations.

Explanation will then be made in connection with the case where a marking work is conducted not at the optical center of the lens under to be examined but at the position where a prism to be prescribed is added by referring to a flowchart of FIG. 9.

Prism powers for X and Y axes are measured S11 on the basis of the positions of target images formed on the two image sensors arranged perpendicular to each other, and the measured prism powers are denoted by XP and YP respectively.

When the prism representation mode S12 is of an orthogonal coordinate system representation, prescribed values for marking are input as follows:

BASE IN/OUT (Prescribed value in X-axis direction)
BASE UP/DOWN (Prescribed value in Y-axis direction)

The BASE IN/OUT is input as an INXP value S13 (X coordinate in the orthogonal coordinate system representation) but its polarity is inverted depending on whether the lens to be examined is the right or left eye lens. The BASE UP/DOWN is input as an INYP value (Y coordinate in the orthogonal coordinate system representation). When the prism representation mode is of a polar coordinate system representation, prescribed values for marking are input S14 as follows:

PRISM (Prescribed value for distance from the optical center)
BASE (Angle to X axis)

The input PRISM and BASE are transformed S15 into orthogonal coordinate systems in accordance with the following equations:

$$INXP = PRISM \times COS\ BASE$$

$$INYP = PRISM \times SIN\ BASE$$

A target display position is expressed in terms of XD (X axis) and YD (Y axis) and the target is displayed at this coordinate position. The XD and YD are found S16 in accordance with the following equations with use of the INXP and INYP previously input and measured values XP and YP:

$$XD = XP - INXP$$

$$YD = YP - INYP$$

The target display position is determined and displayed S17 by the found XD and YD.

The above operation is repeated S18 until alignment is completed and the prism presetting function is turned OFF S19.

As has been disclosed in the foregoing, in accordance with the automatic lensmeter, the marking work can be highly easily and accurately carried out not at the optical center of the lens to be examined but at the position where a prism to be prescribed is added.

While the invention has been particularly shown and described in reference to preferred embodiments thereof, it will be understood by those skilled in the art that changes in form and details may be made therein without departing from the spirit and scope of the invention.

What is claimed is:

1. An automatic lensmeter for automatically measuring optical characteristics of one of a spherical power lens and a cylindrical power lens to be examined inserted in a measurement optical system, comprising:
    measurement means for measuring a shift between an optical center of the lens to be examined inserted in the measurement optical system and an optical axis of the measurement optical system;
    first calculation means for converting the shift measured by said measurement means into a prism power;
    second calculation means for converting the measured shift as a deviation;
    comparing means for comparing the prism power converted by said first calculation means with a predetermined value, said predetermined value being outside an allowable range of alignment; and
    display means for selectively displaying thereon an image positioning target on the basis of a comparison result obtained by said comparing means, wherein said image positioning target is in a coordinate system having a coordinate axis thereof as the prism power or in a coordinate system having a coordinate axis thereof as the deviation.

2. An automatic lensmeter as set forth in claim 1, wherein said display for displaying thereon said image positioning target is one of an LED dot-matrix display and a CRT monitor.

3. An automatic lensmeter as set forth in claim 1, wherein a configuration of said image positioning target varies depending on said selected coordinate system.

4. An automatic lensmeter as set forth in claim 1, wherein a configuration of said image positioning target is varied when cylindrical axial angle of said lens to be examined coincides with a predetermined direction.

5. An automatic lensmeter as set forth in claim 1, wherein said first and second calculation means make up a common microcomputer.

6. An automatic lensmeter for automatically measuring optical characteristics of one of a spherical power lens and a cylindrical power lens to be examined inserted in a measurement optical system, comprising:
    measurement means for measuring a shift between an optical center of the lens to be examined inserted in the measurement optical system and an optical axis of the measurement optical system;
    calculation means for calculating at least one of a prism power and a deviation on the basis of the shift measured by said measurement means;
    input means for entering pre-measured prism power of an eye to be examined;
    coordinate transformation means for transforming a positional coordinate system of one of the prism power and the deviation calculated by said calculation means having the optical axis of the measurement optical system as an origin into a coordinate system having a position of the prism power entered through said input means as an origin; and
    formation means for forming an image positioning target on a display in the coordinate system transformed by said coordinate transformation means.

7. An automatic lensmeter as set forth in claim 6, wherein said input means has selection means for arbitrarily selecting one of a polar coordinate system representation and an orthogonal coordinate system representation.

* * * * *